(12) United States Patent
Hwang et al.

(10) Patent No.: US 8,498,984 B1
(45) Date of Patent: Jul. 30, 2013

(54) CATEGORIZATION OF SEARCH RESULTS

(75) Inventors: Yong Soo Hwang, Seoul (KR); Jaeho Kang, Seoul (KR); Jungyeol Lee, Gimhae-si (KR); Junyoung Lee, Mountain View, CA (US); Minkoo Seo, GunPoSi (KR)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/301,228

(22) Filed: Nov. 21, 2011

(51) Int. Cl.
*G06F 7/00* (2006.01)
*G06F 17/30* (2006.01)

(52) U.S. Cl.
USPC .......................... 707/731; 707/723; 707/732

(58) Field of Classification Search
USPC ....................................................... 707/731
See application file for complete search history.

(56) References Cited

U.S. PATENT DOCUMENTS

| | | | |
|---|---|---|---|
| 8,214,361 B1* | 7/2012 | Sandler et al. | 707/732 |
| 8,224,857 B2* | 7/2012 | Doganata et al. | 707/791 |
| 2002/0078045 A1* | 6/2002 | Dutta | 707/7 |
| 2003/0195877 A1* | 10/2003 | Ford et al. | 707/3 |
| 2004/0267717 A1* | 12/2004 | Slackman | 707/3 |
| 2009/0254544 A1* | 10/2009 | Crosby et al. | 707/5 |
| 2012/0209831 A1* | 8/2012 | Rehman | 707/723 |

OTHER PUBLICATIONS

Mika Kaki, "Findex: Search Result Categories Help Users When Document Ranking Fails", Apr. 2005.*
"Google Categories", Apr. 2007.*

* cited by examiner

*Primary Examiner* — Binh V Ho
(74) *Attorney, Agent, or Firm* — Harrity & Harrity, LLP

(57) ABSTRACT

A server is configured to receive a search query from a client device; identify documents as search results relevant to the search query, where each of the search results has a respective first score; rank the search results, based on the respective first scores, to form a ranked list of search results, where each of the search results has a respective position, within the ranked list, that is based on the ranking; determine a selection rate corresponding to each of the positions in the ranked list; identify categories with which the search results are associated; generate second scores for the categories based on the selection rates; select search results for the selected categories; generate a search result document that includes information regarding the selected categories and information regarding the selected search results; and provide the search result document for display on the client device.

21 Claims, 9 Drawing Sheets

CATEGORIZATION OF SEARCH RESULTS

BACKGROUND

Many techniques are available to users today to find information on the World Wide Web ("web"). For example, users often use web browsers and/or search engines to find information of interest.

Search engines provide search results in response to a search query from a user. The search results are often presented in a ranked list, based on the search query from the user. The ranked list of search results may include different types of search results. For example, the ranked list may include a mixture of web page search results, news search results, video search results, and/or image search results. If the user is seeking one particular type of search result, the user may not find the mixture of the different types of search results useful.

SUMMARY

According to one possible implementation, a method may include receiving a search query from a client device; identifying documents as search results relevant to the search query, where each of the search results has a respective first score; ranking the search results, based on the respective first scores, to form a ranked list of search results, where each of the search results has a respective position, within the ranked list, that is based on the ranking; determining a selection rate corresponding to each of the positions in the ranked list; identifying categories with which the search results are associated; generating second scores for the categories based on the selection rates, where the second score, for a particular one of the categories, is based on the selection rate corresponding to the position, in the ranked list, of one or more of the search results that are associated with the particular one of the categories; selecting categories based on the second scores of the categories; selecting search results for the selected plurality of categories; generating a search result document that includes information regarding the selected categories and information regarding the selected search results; and providing the search result document for display on the client device.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The following detailed description refers to the accompanying drawings. The same reference numbers in different drawings may identify the same or similar elements.

A system and/or method, as described herein, may group search results into categories to assist users in finding search results of interest. As a result of the grouping, users may be able to locate particular search results in which the users are interested, thereby improving the users' search experience.

A search result, as the term is used herein, is to be broadly interpreted to include any reference to a document that is responsive to a search query. A search result commonly includes a title of the document and a link to, or an address of, the document, and may also include a snippet of text from the document. A document, as the term is used herein, is to be broadly interpreted to include any machine-readable and machine-storable work product. A document may include, for example, an e-mail, a web site, a file, a combination of files, one or more files with embedded links to other files, a news article, a blog, a discussion group forum, etc. In the context of the Internet, a common document is a web page. Web pages often include textual information and may include embedded information, such as meta information, images, hyperlinks, etc., and/or embedded instructions, such as Javascript. A link, as the term is used herein, is to be broadly interpreted to include any reference to a document from another document or another part of the same document.

Figure 1A:
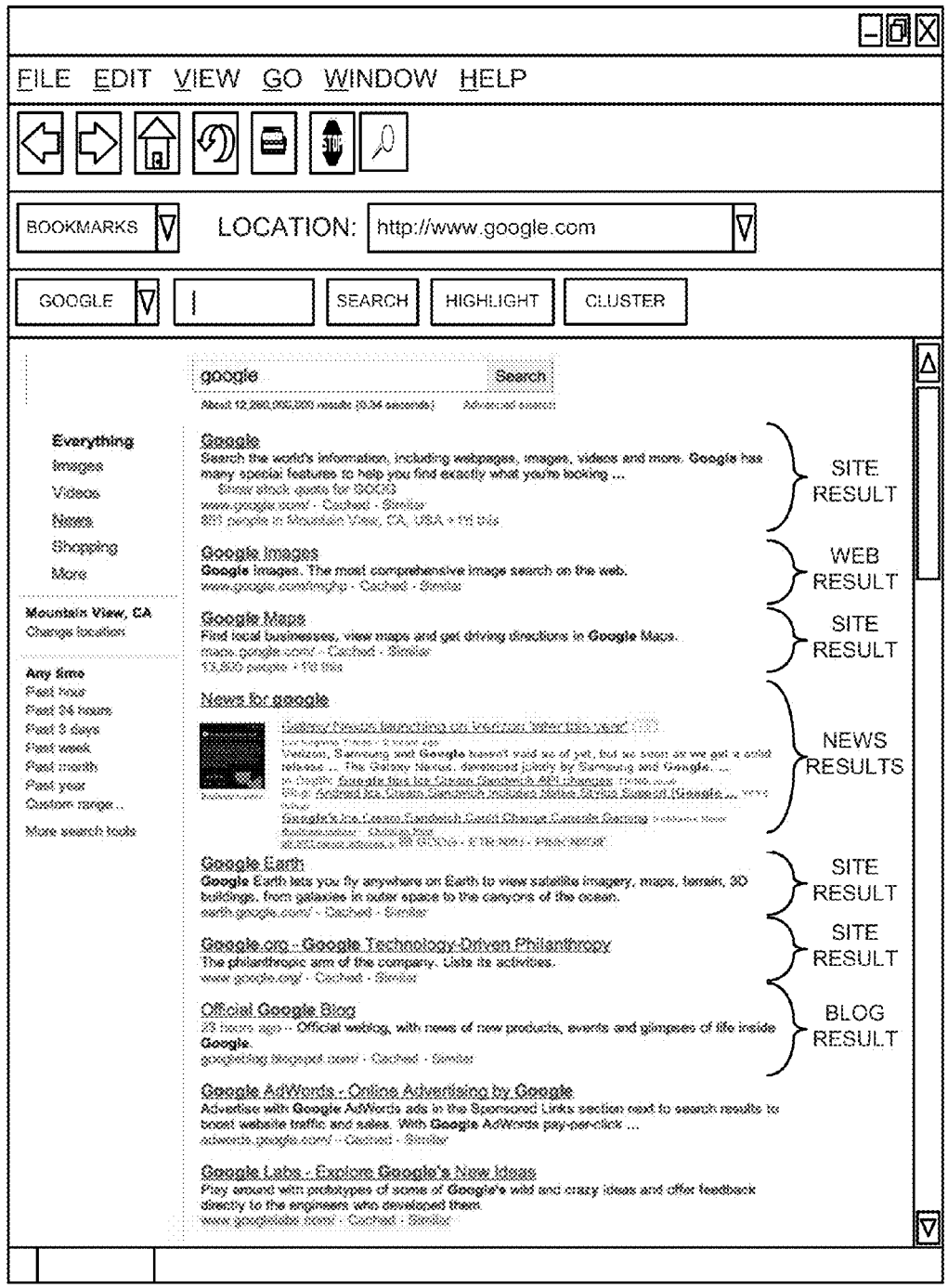
FIGS. 1A and 1B are diagrams illustrating an overview of an example implementation described herein.
Figure 1B:
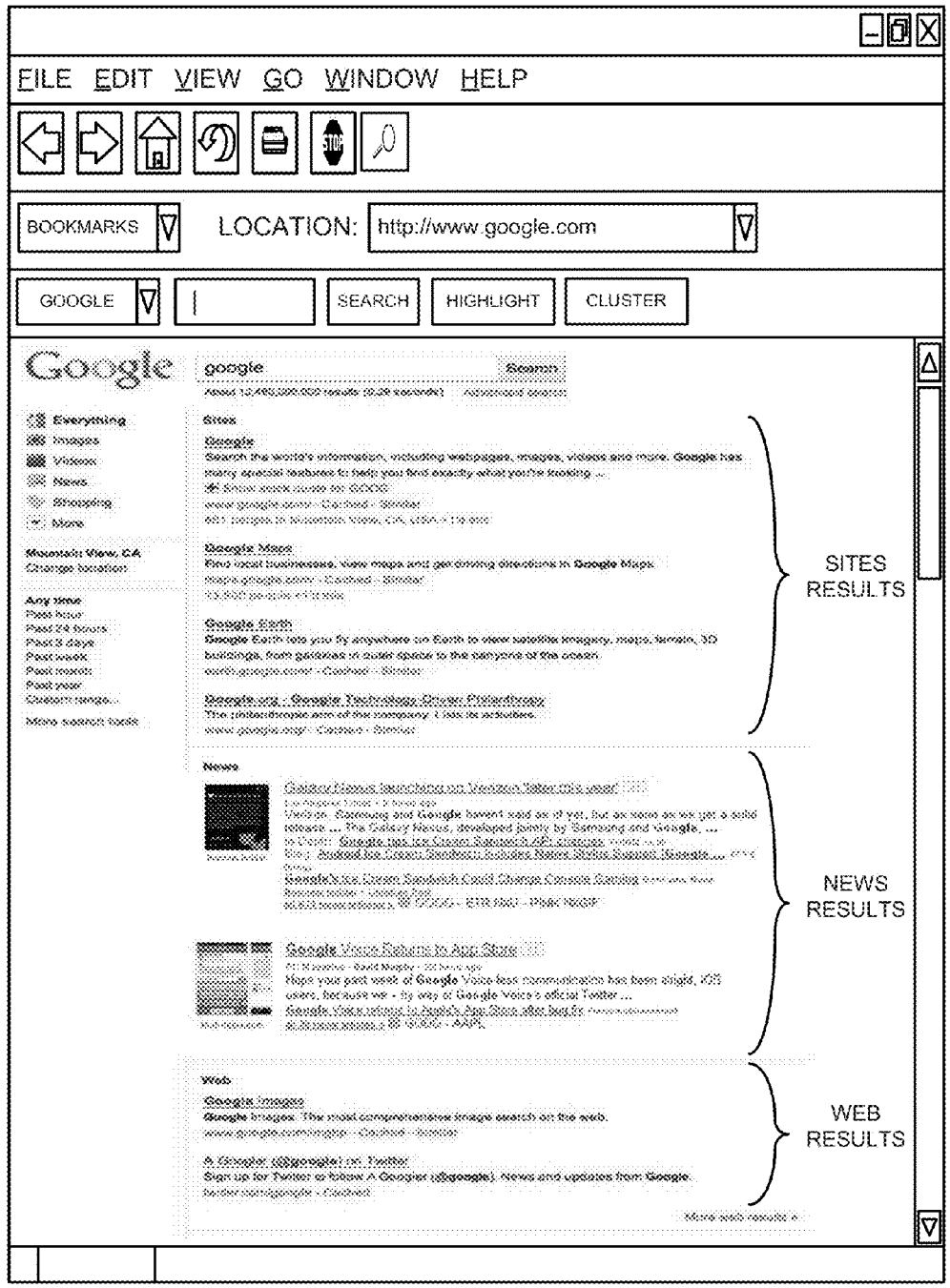

FIGS. 1A and 1B are diagrams illustrating an overview of an example implementation described herein. Assume, for the example implementation described with respect to FIGS. 1A and 1B, that a user desires a search result relating to the search query "Google." The user may use a web browser to access a search engine and provide, to the search engine, the search query "Google." The user may instruct the search engine to perform a search, based on the search query, by selecting a search button. In response to the search query, the search engine may perform a search of one or more indexes and identify documents, as search results, that are relevant to the search query. The search results may include different categories of search results, such as site search results, web search results, blog search results, and/or news search results. The search engine may generate scores for the search results based on a measure of relevance of the search results. The search engine may generate a list of search results and provide the list of search results for display, to the user, via the web browser.

FIG. 1A illustrates a list of search results that may be provided by a search engine. As shown in FIG. 1A, the search engine may order the search results, based on the scores, to form the list of search results. The list of search results may include a mixture of different categories of search results. For example, as shown in FIG. 1A, the list of search results may include one or more site search results, one or more web search results, one or more news search results, and one or more blog search results. The search results may be ordered based on their scores, and irrespective of their categories. For example, a site search result may be followed by a web search result; the web search result may be followed by another site search result; the other site search results may be followed by news search results; the news search results may be followed by two more site search results; and the two site search results may be followed by a blog search result. The user may need to browse the list of search results to locate the particular category of search result in which the user is interested, and then locate the particular search result, of that particular category of search result, in which the user is interested.

FIG. 1B illustrates another list of search results that may be provided by a search engine. As shown in FIG. 1B, the search engine may assign the search results to categories, score the categories, and order the categories based on their scores to form the list of search results. For example, as shown in FIG. 1B, the list of search results may include a sites category, a news category, and a web category. The sites category may include one or more search results that have been assigned to the sites category. The news category may include one or more search results that have been assigned to the news category. The web category may include one or more search results that have been assigned to the web category. As a result, the user may easily locate the particular category of search result in which the user is interested, and more easily locate the particular search result, of the particular category, in which the user is interested. This may improve the user's search experience.

Figure 2:
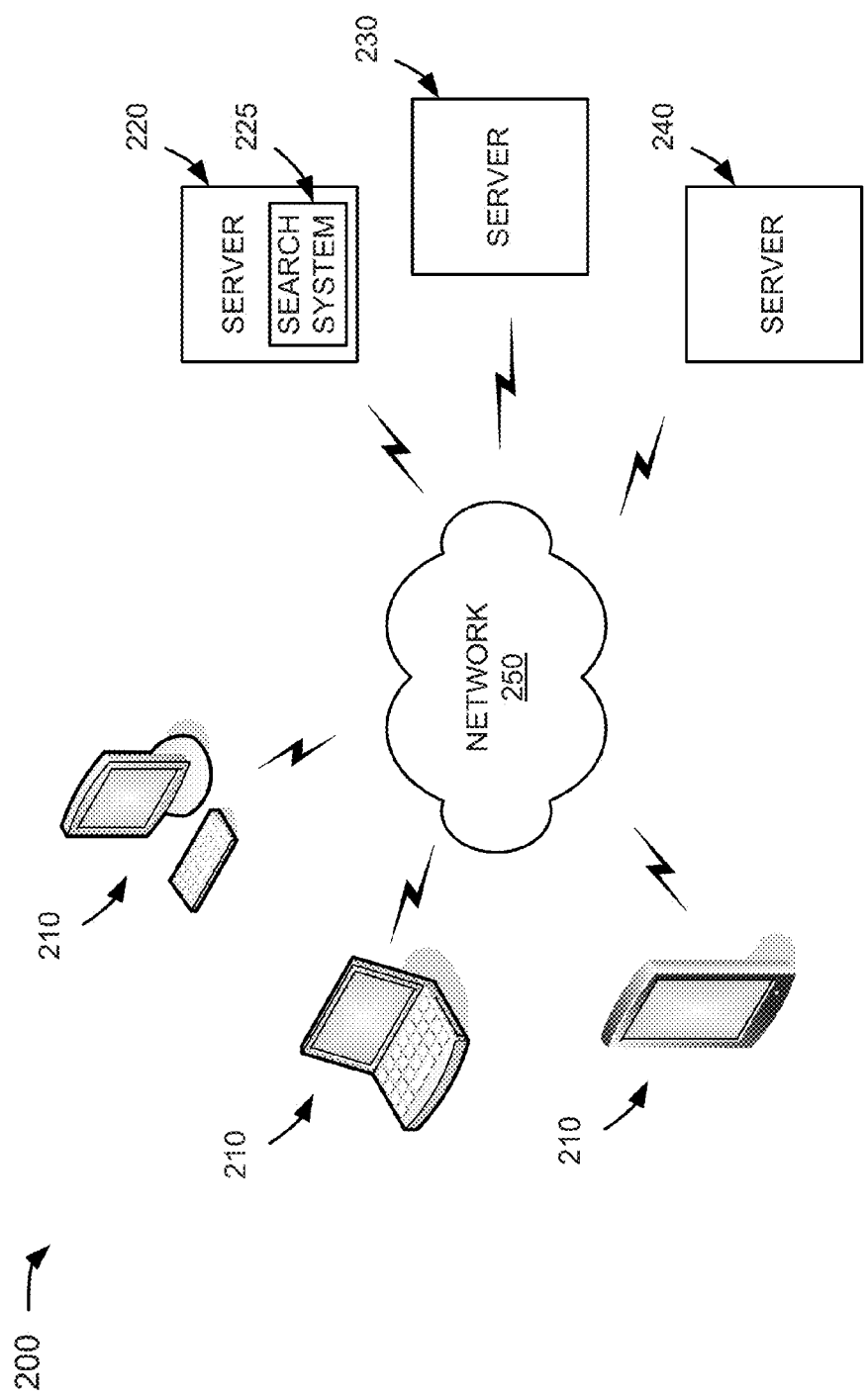
FIG. 2 is a diagram of an example environment in which systems and/or methods described herein may be implemented.

FIG. 2 is a diagram of an example environment 200 in which systems and/or methods described herein may be implemented. Environment 200 may include multiple clients 210 connected to multiple servers 220, 230, and 240 via a network 250. Three clients 210 and three servers 220, 230, and 240 have been illustrated as connected to network 250 for simplicity. In practice, there may be additional or fewer clients and servers. Also, in some instances, a client may perform a function of a server, and a server may perform a function of a client.

Each of clients 210 may include a client device, such as personal computer, a wireless telephone, a personal digital assistant ("PDA"), a laptop, a tablet computer, or another type of computation or communication device. Clients 210 may include user interfaces presented through one or more browsers (e.g., web browsers, such as Chrome).

Servers 220, 230, and 240 may include server devices that gather, process, search, and/or implement functions in a manner described herein. Each server 220, 230, or 240 may be implemented as a single server device or a collection of server devices that may be co-located or remotely located. Additionally, or alternatively, any two or more of servers 220, 230, and 240 may be implemented within a single, common server device or a single, common collection of server devices. While servers 220, 230, and 240 are shown as separate components, it may be possible for one or more of servers 220, 230, and/or 240 to perform one or more of the functions of another one or more of servers 220, 230, and/or 240.

As shown in FIG. 2, server 220 may implement a search system 225 that receives search queries from clients 210, and that provides lists of search results that are responsive to the search queries. Server 220 may crawl a corpus of documents (e.g., web documents), index the documents, and store information associated with the documents in a repository of documents. Servers 230 and 240 may store or maintain documents that may be crawled or analyzed by server 220.

Network 250 may include any type of network, such as a local area network ("LAN"), a wide area network ("WAN"), a telephone network, such as the Public Switched Telephone Network ("PSTN") or a cellular network, an intranet, the Internet, or a combination of networks. Clients 210 and servers 220, 230, and 240 may connect to network 250 via wired and/or wireless connections. In other words, any one of clients 210 and servers 220, 230, and 240 may connect to network 250 via a wired connection, a wireless connection, or a combination of a wired connection and a wireless connection.

Figure 3:
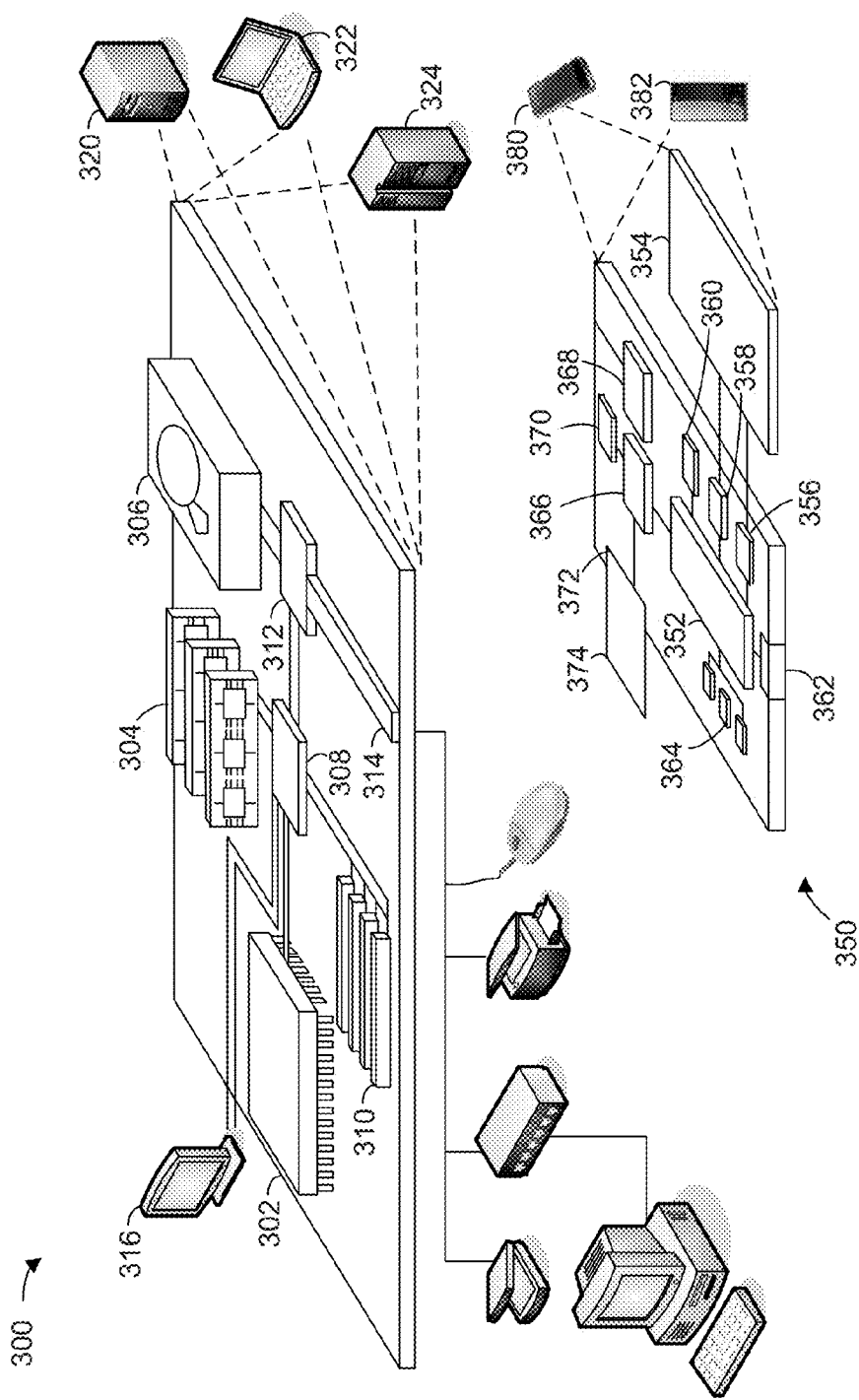
FIG. 3 is a diagram of an example of a generic computer device and a generic mobile computer device.

FIG. 3 is a diagram of an example of a generic computing device 300 and a generic mobile computing device 350, which may be used with the techniques described here. Generic computing device 300 or generic mobile computing device 350 may correspond to, for example, a client 210 and/or a server 220, 230, or 240. Computing device 300 is intended to represent various forms of digital computers, such as laptops, desktops, workstations, personal digital assistants, servers, blade servers, mainframes, and other appropriate computers. Mobile computing device 350 is intended to represent various forms of mobile devices, such as personal digital assistants, cellular telephones, smart phones, and other similar computing devices. The components shown in FIG. 3, their connections and relationships, and their functions, are meant to be examples only, and are not meant to limit implementations described herein.

Computing device 300 may include a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. Processor 302 can process instructions for execution within the computing device 300, including instructions stored in the memory 304 or on the storage device 306 to display graphical information for a graphical user interface (GUI) on an external input/output device, such as display 316 coupled to high speed interface 308. In other implementations, multiple processors and/or multiple buses may be used, as appropriate, along with multiple memories and types of memory. Also, multiple computing devices 300 may be connected, with each device providing portions of the necessary operations, as a server bank, a group of blade servers, or a multi-processor system, etc.

Memory 304 stores information within the computing device 300. In one implementation, memory 304 includes a volatile memory unit or units. In another implementation, memory 304 includes a non-volatile memory unit or units. The memory 304 may also be another form of computer-readable medium, such as a magnetic or optical disk. A computer-readable medium may refer to a non-transitory memory device. A memory device may refer to storage space within a single storage device or spread across multiple storage devices.

The storage device 306 is capable of providing mass storage for the computing device 300. In one implementation, storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described herein. The information carrier is a computer or machine-readable medium, such as memory 304, storage device 306, or memory on processor 302.

High speed controller 308 manages bandwidth-intensive operations for the computing device 300, while low speed controller 312 manages lower bandwidth-intensive operations. Such allocation of functions is exemplary only. In one implementation, high-speed controller 308 is coupled to memory 304, display 316 (e.g., through a graphics processor or accelerator), and to high-speed expansion ports 310, which may accept various expansion cards (not shown). In this implementation, low-speed controller 312 is coupled to storage device 306 and low-speed expansion port 314. The low-speed expansion port, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

Computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as mobile computing device 350. Each of such devices may contain one or more of computing devices 300, 350, and an entire system may be made up of multiple computing devices 300, 350 communicating with each other.

Mobile computing device 350 may include a processor 352, memory 364, an input/output ("I/O") device such as a display 354, a communication interface 366, and a transceiver 368, among other components. Mobile computing device 350 may also be provided with a storage device, such as a microdrive or other device, to provide additional storage. Each of the components 350, 352, 364, 354, 366, and 368 are interconnected using various buses, and several of the components may be mounted on a common motherboard or in other manners as appropriate.

Processor 352 can execute instructions within mobile computing device 350, including instructions stored in memory 364. Processor 352 may be implemented as a chipset of chips that include separate and multiple analog and digital processors. Processor 352 may provide, for example, for coordination of the other components of mobile computing device 350, such as control of user interfaces, applications run by mobile computing device 350, and wireless communication by mobile computing device 350.

Processor 352 may communicate with a user through control interface 358 and display interface 356 coupled to a display 354. Display 354 may be, for example, a TFT LCD (Thin-Film-Transistor Liquid Crystal Display) or an OLED (Organic Light Emitting Diode) display, or other appropriate display technology. Display interface 356 may comprise appropriate circuitry for driving display 354 to present graphical and other information to a user. Control interface 358 may receive commands from a user and convert them for submission to the processor 352. In addition, an external interface 362 may be provide in communication with processor 352, so as to enable near area communication of mobile computing device 350 with other devices. External interface 362 may provide, for example, for wired communication in some implementations, or for wireless communication in other implementations, and multiple interfaces may also be used.

Memory 364 stores information within mobile computing device 350. Memory 364 can be implemented as one or more of a computer-readable medium or media, a volatile memory unit or units, or a non-volatile memory unit or units. Expansion memory 374 may also be provided and connected to mobile computing device 350 through expansion interface 372, which may include, for example, a SIMM (Single In Line Memory Module) card interface. Such expansion memory 374 may provide extra storage space for device 350, or may also store applications or other information for mobile computing device 350. Specifically, expansion memory 374 may include instructions to carry out or supplement the processes described above, and may include secure information also. Thus, for example, expansion memory 374 may be provide as a security module for mobile computing device 350, and may be programmed with instructions that permit secure use of device 350. In addition, secure applications may be provided via the SIMM cards, along with additional information, such as placing identifying information on the SIMM card in a non-hackable manner.

Expansion memory 374 may include, for example, flash memory and/or NVRAM memory. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352, that may be received, for example, over transceiver 368 or external interface 362.

Mobile computing device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver (not shown). In addition, GPS (Global Positioning System) receiver module 370 may provide additional navigation- and location-related wireless data to mobile computing device 350, which may be used as appropriate by applications running on mobile computing device 350.

Mobile computing device 350 may also communicate audibly using audio codec 360, which may receive spoken information from a user and convert it to usable digital information. Audio codec 360 may likewise generate audible sound for a user, such as through a speaker, e.g., in a handset of mobile computing device 350. Such sound may include sound from voice telephone calls, may include recorded sound (e.g., voice messages, music files, etc.) and may also include sound generated by applications operating on mobile computing device 350.

Mobile computing device 350 may be implemented in a number of different forms, as shown in the figure. For example, it may be implemented as a cellular telephone 380. It may also be implemented as part of a smart phone 382, personal digital assistant, or other similar mobile device.

Various implementations of the systems and techniques described herein can be realized in digital electronic circuitry, integrated circuitry, specially designed ASICs (application specific integrated circuits), computer hardware, firmware, software, and/or combinations thereof. These various implementations can include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any apparatus and/or device (e.g., magnetic discs, optical disks, memory, Programmable Logic Devices ("PLDs")) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described herein can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described herein can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

Figure 4:
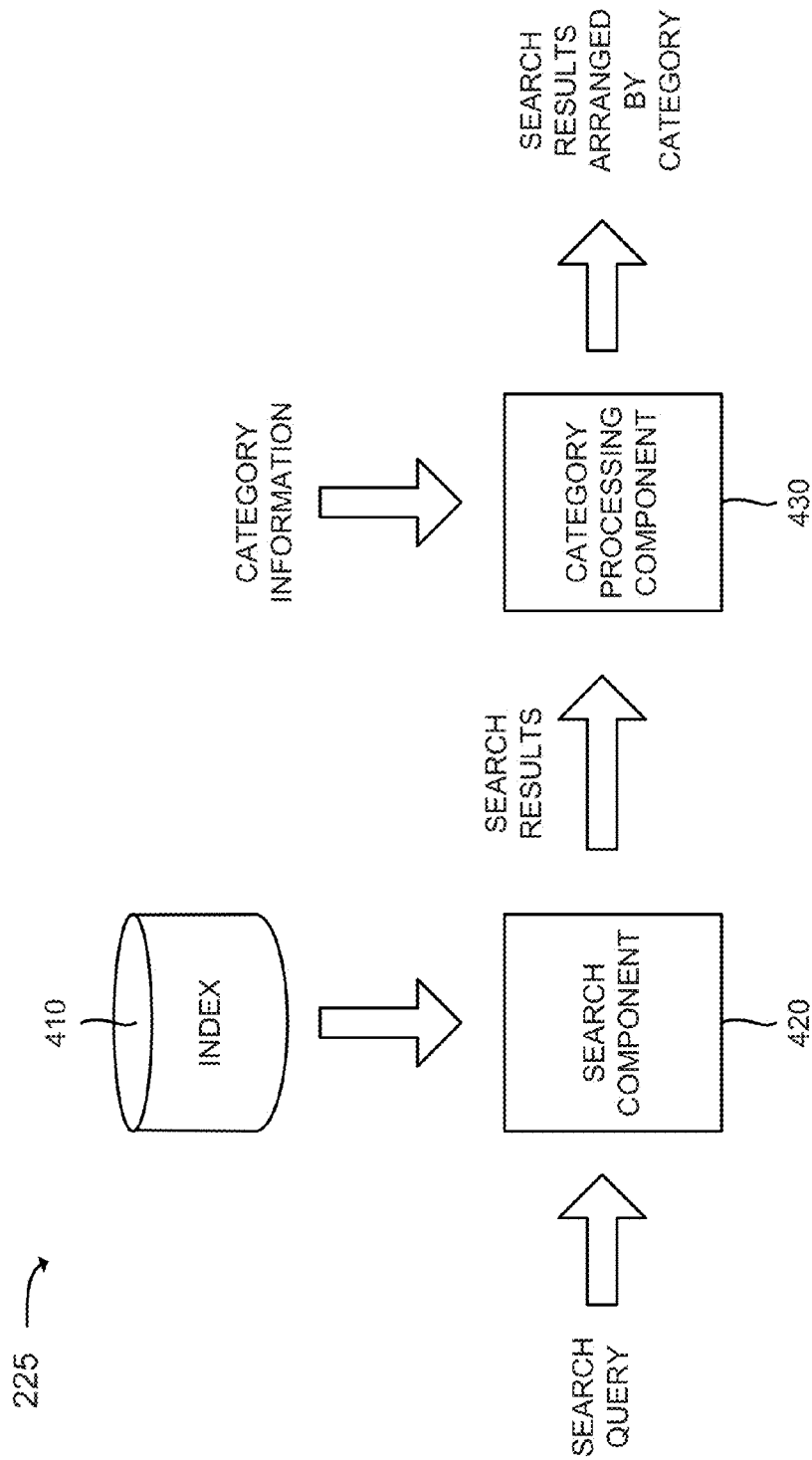
FIG. 4 is a diagram of example functional components of a search system of FIG. 2.

FIG. 4 is a diagram of example functional components of search system 225. Each of the functional blocks, shown in FIG. 4, may be implemented by one or more of the components described with regard to FIG. 3. As shown in FIG. 4, search system 225 may include an index 410, a search component 420, and a category processing component 430. In another implementation, search system 225 may include additional or fewer functional components than are illustrated in FIG. 4.

Index 410 may represent one or more indexes that may be stored in one or more memory devices, which may be co-located or remotely located. In one implementation, index 410 may represent a single index. The single index may store information regarding multiple categories of documents. For example, the single index may store information regarding web documents, blog documents, video documents, news documents, image documents, site documents, forum documents, or the like. Generally, a web document may refer to a web page or another type of document that is not assigned to one of the other categories; a blog document may refer to a blog or a portion of a blog, such as a blog post; a video document may refer to a video file; a news document may refer to a news article or another type of document that conveys a news story; an image document may refer to an image file; a site document may refer to a home page of a web site; and a forum document may refer to a document that includes a forum or message board or a portion of a forum or message board.

In another implementation, index 410 may represent multiple indexes. Each of the indexes may store information regarding one or more categories of documents. For example, a first index may store information regarding web documents, a second index may store information regarding blog documents, a third index may store information regarding video documents, a fourth index may store information regarding news documents, a fifth index may store information regarding image documents, a sixth index may store information regarding site documents, and a seventh index may store information regarding forum documents. Alternatively, each index, in a first set of indexes, may store information regarding two or more categories of documents, and each index, in a second set of indexes, may store information regarding a single category of document.

While certain categories of documents have been listed above and will be used throughout this description, these categories are provided only as examples. Index 410 may store information for two or more of the listed categories of documents and/or other categories of documents, such as product documents that include product information; e-mail documents that include e-mails, instant messages, or other forms of communication; local documents that include business information; map documents that include map information; etc.

Each entry in index 410 may store information identifying an address, such as a uniform resource locator (URL) or uniform resource identifier (URI), associated with a document, keywords associated with the document, and/or a category identifier that identifies a category to which the document is assigned. The information in the entry may be used by search component 420 to identify whether the document is relevant to a search query.

Search component 420 may receive a search query and perform a search of index 410 based on the search query. When index 410 corresponds to a single index, search component 420 may perform a search of the single index to identify documents, as search results that are relevant to the search query. When index 410 corresponds to multiple indexes, search component 420 may perform a search, possibly in parallel, of the multiple indexes to identify documents, in each of the indexes, as search results that are relevant to the search query. Additionally, or alternatively, search component 420 may receive search results, relevant to the search query, from one or more other search systems (not shown).

Search component 420 may generate scores for the search results. As described above, each search result may correspond to a document that has been identified as relevant to the search query. In one implementation, the score, for a search result, may reflect a measure of relevance of the corresponding document to the term(s) of the search query. Several techniques exist for measuring the relevance of a document to a search query. In another implementation, the score, for a search result, may reflect a measure of quality of the corresponding document. In this other implementation, the search query may be used to identify a relevant document, which is scored based on the document's measure of quality. Several techniques exist for measuring the quality of a document, such as a link-based technique, a technique based on the source of the document, a technique based on an age of the document, a technique based on selections or accesses of the document, etc. In yet another implementation, the score, for a search result, may reflect a combination of a measure of relevance of the corresponding document to a search query and a measure of quality of the corresponding document. In a further implementation, the score, for a search result, may reflect a weighted combination of a measure of relevance of the corresponding document to a search query and a measure of quality of the corresponding document, where the measure of relevance may be weighted differently from the measure of quality. In yet a further implementation, the score, for a search result, may be determined in another manner.

Search component 420 may rank the search results based on the scores. For example, search component 420 may create a list of search results and sort the search results, in the list, based on the scores of the search results. In one possible implementation, search component 420 may combine search results obtained from multiple indexes and/or multiple sources. In this case, there is a possibility that the scoring techniques, used for the multiple indexes and/or used by the multiple sources may differ. As a result, search component 420 may normalize the scores of the search results and create the list of search results by arranging the search results based on the normalized scores of the search results. Search component 420 may provide the list of search results to category processing component 430.

Category processing component 430 may obtain, or derive, category information for each of the search results to determine the categories to which the search results are assigned. Category processing component 430 may generate scores for the categories and determine the manner in which to present the search results, in relation to the categories, based on the scores for the categories, as described in more detail below with reference to FIG. 5. Category processing component 430 may output the search results organized by the categories to which the search results are assigned.

Figure 5:
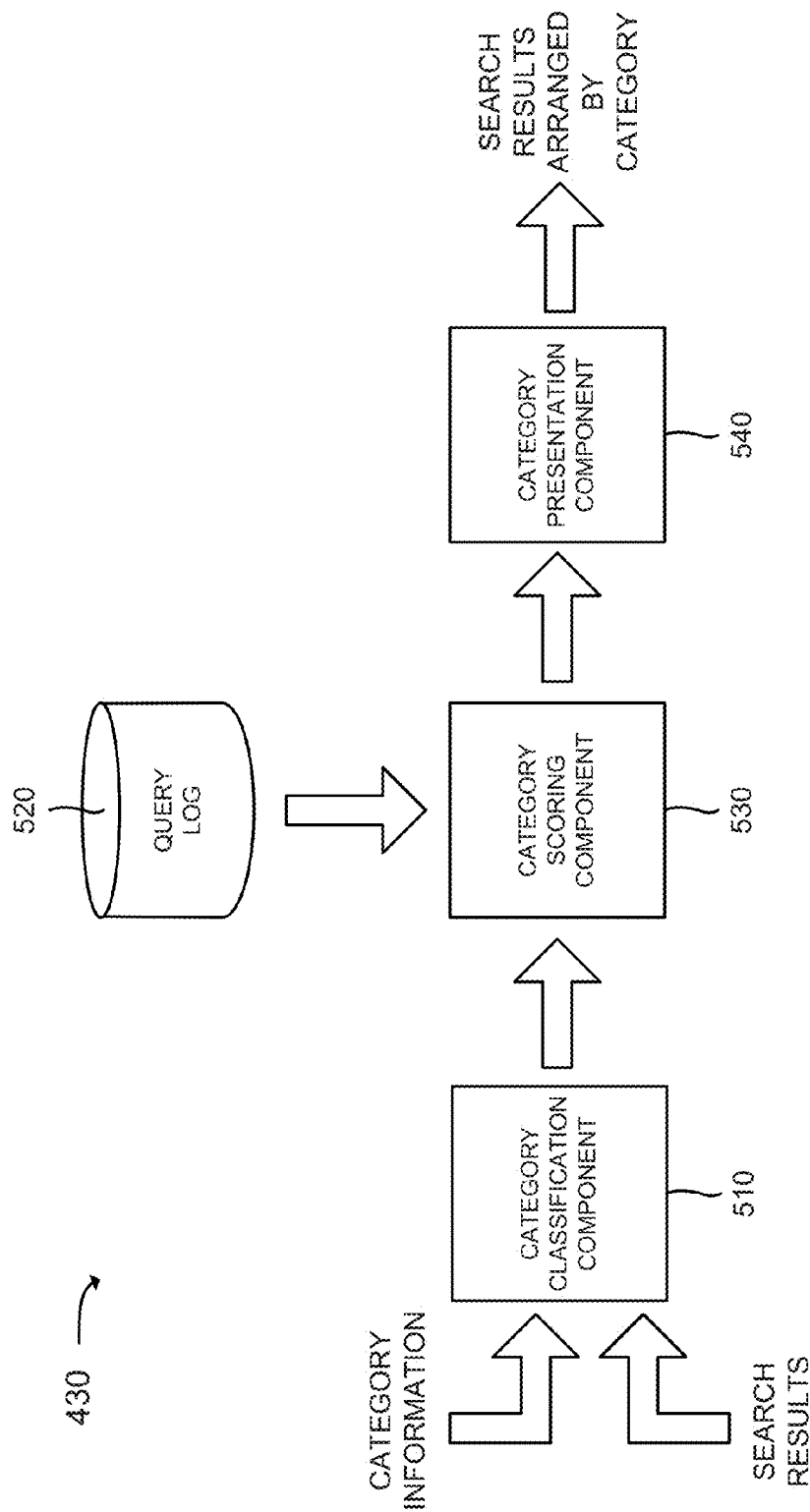
FIG. 5 is a diagram of example functional components of the category processing component of FIG. 4.

FIG. 5 is a diagram of example functional components of category processing component 430. Each of the functional blocks, shown in FIG. 5, may be implemented by one or more of the components described with regard to FIG. 3. As shown in FIG. 5, category processing component 430 may include a category classification component 510, a query log 520, a category scoring component 530, and a category presentation component 540. In another implementation, category processing component 430 may include additional or fewer components than are illustrated in FIG. 5.

Category classification component 510 may assign search results to categories. In one implementation, category classification component 510 may assign a search result to a category by looking up the category information in a memory device, such as index 410, a table, or the like. For example, category classification component 510 may obtain the category information from an entry, corresponding to the search result, in index 410.

In another implementation, category classification component 510 may use one or more classification techniques to assign a search result to a category. One technique may use information within, or associated with, a document to determine the category for the document. For example, this technique may analyze the content of the document or metadata, associated with the document, to identify the category to which the document is to be assigned. Another technique may use information regarding the address of the document to determine the category for the document. For example, this technique may compare the address (e.g., URL or URI), of the document, to addresses in a list. When the address matches an address in the list, the document may be assigned to a particular category that is identified, in the list, as associated with the address. Alternatively, or additionally, this technique may analyze the address to determine whether the address matches a pattern of addresses of documents that are assigned to a particular category. In performing this analysis, category classification component 510 may use a regular expression. For the sites category, for example, the addresses may match a regular expression of *.com, where "*" represents any character or symbol. Yet another technique may use information regarding the format of the document, such as a file type, to identify the category to which the document is assigned. For example, if the file type includes a file type of a video file or the file type of an image file, then the document may be assigned to a video category or an image category, respectively. A further technique may use a combination of the above-identified techniques and/or another technique to assign a document to a category.

In a further implementation, category classification component 510 may use a combination of the above-identified processes to assign search results to categories. For example, category classification component 510 may assign some search results to categories by looking up the category information in a memory device, such as index 410, and may assign other search results to categories using one or more classification techniques. In this implementation, category classification component 510 may use category information in index 410 for a particular search result, if index 410 stores category information for the particular search result. Otherwise, category classification component 510 may use a classification technique to determine category information for the particular search result.

Query log 520 may store query log information in one or more memory devices, which may be co-located or remotely located. In one implementation, the query log information may include information for one or more search queries. For example, for a particular search query, the information may include a selection rate, such as a click through rate, for each search result position in a list of search results that is generated in response to the particular search query. For example, for the particular search query, the query log information may indicate the selection rate for the search result located in the first (top-most) position in the list of search results; the selection rate for the search result located in the second (next-to-top-most) position in the list of search results; and so on. In another implementation, the query log information may include information that indicates a selection rate, such as a click through rate, for the documents (rather than the positions) corresponding to the search results. For example, the query log information may indicate the selection rate for a document corresponding to a first search result in the list of search results; the selection rate for a document corresponding to a second search result in the list of search results; and so on.

Query log 520 may obtain the query log information by analyzing selections of search results, of a group of users, in response to the users being presented with lists of search results. Query log 520 may collect information regarding the selections of search results in an anonymous manner.

Category scoring component 530 may generate scores for the categories to which the search results are assigned. In one possible implementation, category scoring component 530 may filter the search results prior to generating the scores for the categories. For example, category scoring component 530 may remove any search results, which have a score below a threshold, from further consideration when determining the scores for the categories. Alternatively, category scoring component 530 may select Z search results (Z>1, such as Z≈30), with the highest scores, for consideration when determining the scores for the categories.

There are several possible techniques that category scoring component 530 may use to score the categories. For example, category scoring component 530 may generate a score for a particular category based on a quantity of the search results that have been assigned to the particular category. If twenty of the search results have been assigned to the particular category, the particular category may be assigned a score that is a function of twenty.

Alternatively, category scoring component 530 may generate a score for a particular category based on the scores of one or more of the search results that have been assigned to the particular category. For example, if ten search results have been assigned to the particular category, the particular category may be assigned a score that is a function of the score of the N highest-scoring search results (N≧1, such as N≈10, 5, or 3), a function of the average score of the ten search results or the M highest-scoring search results (M>1, such as M≈3 or 5), a function of the median or mean score of the ten search results or the M highest-scoring search results, or some other function of the score of one or more of the ten search results.

Alternatively, category scoring component 530 may determine a value for each of the search results and generate scores for the categories based on these values. In one implementation, the value, for a search result, may be based on information regarding the document corresponding to the search result. For example, the value, for a particular search result, may correspond to an actual selection rate of the document corresponding to the particular search result. Category scoring component 530 may obtain the actual selection rates for the search results from query log 520. Alternatively, category scoring component 530 may estimate the selection rates for the search results. In this case, category scoring component 530 may use information from query log 520, or another log that includes information regarding selections of search results, to assist in estimating the selection rates. When determining the value for a particular search result, category scoring component 530 may use the actual selection rate as the value for the particular search result, if the actual selection rate is available in query log 520. Otherwise, category scoring component 530 may use the estimated selection rate as the value for the particular search result. Alternatively, category scoring component 530 may select the actual selection rate or the estimated selection rate as the value for the particular search result. For example, category scoring component 530 may select the maximum of the actual selection rate or the estimated selection rate as the value for the particular search result. Alternatively, category scoring component 530 may use an average, or weighted average, of the actual selection rate and the estimated selection rate as the value for the particular search result.

Category scoring component 530 may determine the score for a particular category as a function of the values of the search results assigned to the particular category. In one example implementation, category scoring component 530 may determine the score for a category based on the highest value of the values of the search results assigned to that category. In another example implementation, category scoring component 530 may determine the score for a category based on an average of the highest X values (X>1, such as X≈3 or 5) of the search results assigned to that category. In yet another example implementation, category scoring component 530 may determine the score for a category based on a weighted average of the highest X values of the search results assigned to that category. In a further example implementation, category scoring component 530 may determine the score for a category based on some other combination of one or more of the values of the search results assigned to that category.

In another implementation, the value, for a search result, may be based on the position of the search result in the list of search results. For example, the first position in the list of search results may have a first value, the second position in the list of search results may have a second value, and so on. The value, for a particular position, may correspond to an actual selection rate associated with the particular position for a particular search query. Category scoring component 530 may obtain the actual selection rates for the positions from query log 520. Alternatively, category scoring component 530 may estimate the selection rates for the positions. In this case, category scoring component 530 may use information from query log 520, or another log that includes information regarding selections of search results, to assist in estimating the selection rates. The following is an example of estimated selection rates for the top ten positions (irrespective of the categories associated with the positions): 37.3% for position 1, 12.9% for position 2, 10.1% for position 3, 9.3% for position 4, 7.2% for position 5, 5.0% for position 6, 3.4% for position 7, 2.8% for position 8, 2.5% for position 9, and 2.1% for position 10. The following is another example of estimated selection rates for the top ten positions (irrespective of the categories associated with the positions): 33.7% for position 1, 14.4% for position 2, 9.4% for position 3, 8.2% for position 4, 6.5% for position 5, 4.8% for position 6, 3.9% for position 7, 3.3% for position 8, 2.9% for position 9, and 2.8% for position 10. The following is yet another example of estimated selection rates for the top ten positions (irrespective of the categories associated with the positions): 24.8% for position 1, 16.2% for position 2, 13.3% for position 3, 9.8% for position 4, 7.2% for position 5, 5.1% for position 6, 3.4% for position 7, 2.7% for position 8, 2.4% for position 9, and 2.1% for position 10.

When determining the value for a particular position, category scoring component 530 may use the actual selection rate as the value for the particular position, if the actual selection rate is available in query log 520. Otherwise, category scoring component 530 may use the estimated selection rate as the value for the particular position. Alternatively, category scoring component 530 may select the actual selection rate or the estimated selection rate as the value for the particular position. For example, category scoring component 530 may select the maximum of the actual selection rate or the estimated selection rate as the value for the particular position. Alternatively, category scoring component 530 may use an average, or weighted average, of the actual selection rate and the estimated selection rate as the value for the particular position.

Category scoring component 530 may determine the score for a particular category as a function of the values of the positions of the search results, within the list of search results, assigned to the particular category. In one example implementation, category scoring component 530 may determine the score for a category based on the highest value of the values of the search results assigned to that category. In another example implementation, category scoring component 530 may determine the score for a category based on an average of the highest X values of the search results assigned to that category. In yet another example implementation, category scoring component 530 may determine the score for a category based on a weighted average of the highest X values of the search results assigned to that category. In a further example implementation, category scoring component 530 may determine the score for a category based on some other combination of one or more of the values of the search results assigned to that category.

Alternatively, category scoring component 530 may use a combination of the above-identified techniques or another technique not specifically mentioned above to generate scores for the categories.

Category presentation component 540 may generate a search result document. Category presentation component 540 may select categories to include in the search result document and may select search results to include for each of the selected categories.

In one implementation, category presentation component 540 may select T of the categories (T>1), such as the T categories with the highest scores among the scores assigned to the categories. In another implementation, category presentation component 540 may weight the scores assigned to the categories and select T of the categories based on the weighted scores, such as the T categories with the highest weighted scores. For example, in this other implementation, the categories may be assigned different weights. The weights may be preset or based on an estimation of a measure of relevance of the categories to the search query.

In yet another implementation, category presentation component 540 may always select one or more of the categories, regardless of the scores assigned to these categories, and then select one or more other categories based on the scores assigned to the other categories. For example, category presentation component 540 may always select the web category, regardless of the score assigned to the web category, and may select one or more other categories, such as the news category, the blog category, the sites category, or the like, based on the scores assigned to these other categories.

In a further implementation, category presentation component 540 may select all of the categories associated with V of the search results (V>1, such as V≈10), such as V of the search results with the highest scores among the scores assigned to the search results. For example, category presentation component 540 may identify the categories associated with the top ten search results in the list of search results, and may select these categories to include in the search result document.

Once category presentation component 540 selects categories to include in the search result document, category presentation component 540 may select search results to include for the selected categories. In one implementation, category presentation component 540 may select a particular quantity of search results for each of the selected categories if that particular quantity of search results is available in the list of search results. This particular quantity may be the same, or different, for the different selected categories. For example, assume that the particular quantity has been set at five, that there are ten search results in the list of search results for a first category, and that there are three search results in the list of search results for a second category. In this example, category presentation component 540 may select five of the ten search results for the first category, such as the five search results with the highest scores or values, and may select all three of the search results for the second category.

In another implementation, category presentation component 540 may select search results to guarantee that the top scoring A search results (A>1, such as A≈10) are included in the search result document and/or that the top scoring B search results (B≧A, such as B≈30) are included in the search result document. For example, category presentation component 540 may include a particular search result in the search result document if the position of the particular search result, in the list of search results, is less than or equal to A; if the quantity of search results selected for the category is less than a minimum configurable threshold (e.g., ≧0); if the quantity of search results selected for the category is less than a maximum configurable threshold (e.g., ≈5) and the score of the particular search result is greater than or equal to a minimum configurable threshold score (e.g., ≈0.5 on a scale of 0.0 to 1.0); and/or if the quantity of search results selected for the category is less than the maximum configurable threshold (e.g., ≈5) and the position of the particular search result, in the list of search results, is less than or equal to B.

In a further implementation, category presentation component 540 may use a combination of two or more of the above-identified example techniques or another technique to select search results to include in the search result document.

In any of the above-identified examples, category presentation component 540 may filter the search results to only include search results, with scores over a particular threshold, in the search result document. For example, category presentation component 540 may remove any search results, that have scores under the particular threshold (e.g., ≈0.5 on a scale of 0.0 to 1.0), from inclusion in the search result document.

Category presentation component 540 may also base the selection of the categories and/or the search results on a type of client 210 used to transmit the search query. For example, category presentation component 540 may use one set of parameters, such as thresholds or quantities, for a client 210 that has a limited display screen size, such as a mobile telephone device, and a second set of parameters, such as thresholds or quantities, for a client 210 that has no such limitations on display screen size, such as a personal computer.

Once category presentation component 540 has selected categories and search results to include in the search result document, category presentation component 540 may generate the search result document to include the selected categories and search results. For example, in one implementation, category presentation component 540 may sort the search results, within a particular category, based on the scores of the search results, and may sort the categories based on the scores of the categories. In another implementation, category presentation component 540 may be configured to always put a particular category in a particular position, such as in the top-most position, within the search result document. For example, category presentation component 540 may always put the web category first and then sort the remaining categories, below the web category, based on their scores. In yet another implementation, category presentation component 540 may predict which of the categories is most responsive to the search query and put that particular category in the top-most position within the search result document. For example, category presentation component 540 may put the category, which has been identified as most responsive to the search query, first and then sort the remaining categories, below the most-responsive category, based on their scores. Category presentation component 540 may generate a search result document, such as a hypertext markup language (HTML) document, and provide the search result document in response to the search query.

Figure 6:
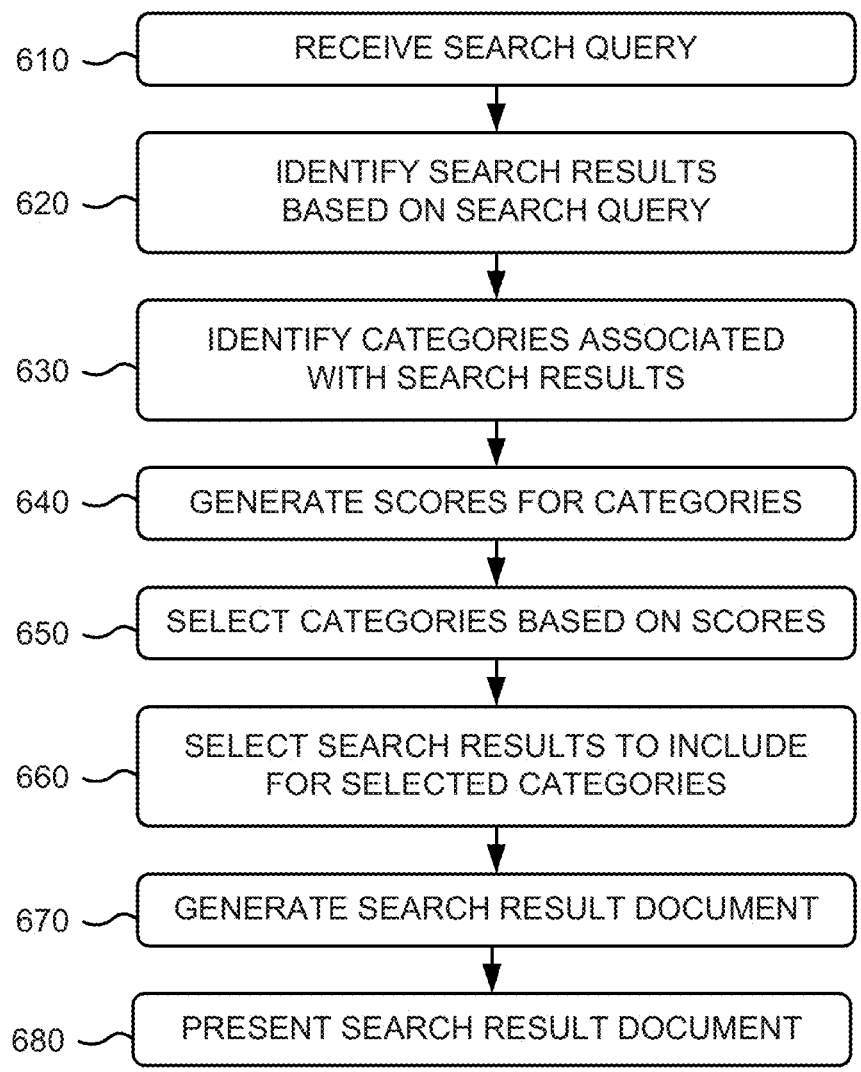
FIG. 6 is a flowchart of an example process for generating a search result document that includes search results organized by category.

FIG. 6 is a flowchart of an example process 600 for generating a search result document that includes search results organized by category. In one implementation, process 600 may be performed by server 220. In another implementation, process 600 may be performed by one or more other devices instead of, or possibly in conjunction with, server 220. For example, some or all of process 600 may be performed by client 210 and/or server 230 or 240.

Process 600 may include receiving a search query (block 610). For example, a user of client 210 may use a browser, such a web browser, to access a user interface of search system 225. Via the user interface, the user may enter a search query. Client 210 may transmit the search query to search system 225. Search system 225 may receive the search query from client 210.

Process 600 may include identifying search results based on the search query (block 620). For example, as described above, search system 225 may perform a search of one or more indexes, such as index 410, to identify documents, as search results that are relevant to the search query. Search system 225 may determine scores for the search results and may rank the search results based on their scores, as described above.

Process 600 may include identifying categories associated with the search results (block 630). For example, search system 225 may obtain, or derive, category information for each of the search results to determine the categories to which the search results are assigned. As described above, search system 225 may assign a search result to a category by looking up the category information in a memory device, such as index 410, and/or by using one or more classification techniques.

Process 600 may include generating scores for the categories (block 640) and selecting categories based on the scores (block 650). For example, search system 225 may generate scores for the categories using one or more of the techniques described above. Search system 225 may use the scores to select one or more of the categories to include in a search result document, as described above.

Process 600 may include selecting search results to include for the selected categories (block 660). For example, as explained above, search system 225 may use one, or a combination, of techniques to select search results to include, in a search result document, for each of the selected categories.

Process 600 may include generating a search result document (block 670), and presenting the search result document (block 680). For example, search system 225 may generate a search result document that includes the selected categories and the selected search results. Search system 225 may sort the search results, within a particular category, based on the scores of the search results, and may sort the categories based on the scores of the categories. Search system 225 may generate a search result document, such as a HTML document, that includes the sorted categories and sorted search results. Search system 225 may provide the search result document for presentation on a display of client 210, as a response to the search query.

In one particular implementation, the search result document may include an option to turn on and off the presentation of the search results in categories. For example, if the search result document presents search results that are organized by category, selection of the option may cause presentation of a search result document where the search results are not necessarily organized by category. In other words, selection of the option may cause another search result document, to be presented, in which the search results are organized by only their measure of relevance and/or their measure of quality. Alternatively, if the search result document presents search results that are not organized by category, selection of the option may cause presentation of a search result document where the search results are organized by category.

Figure 7:
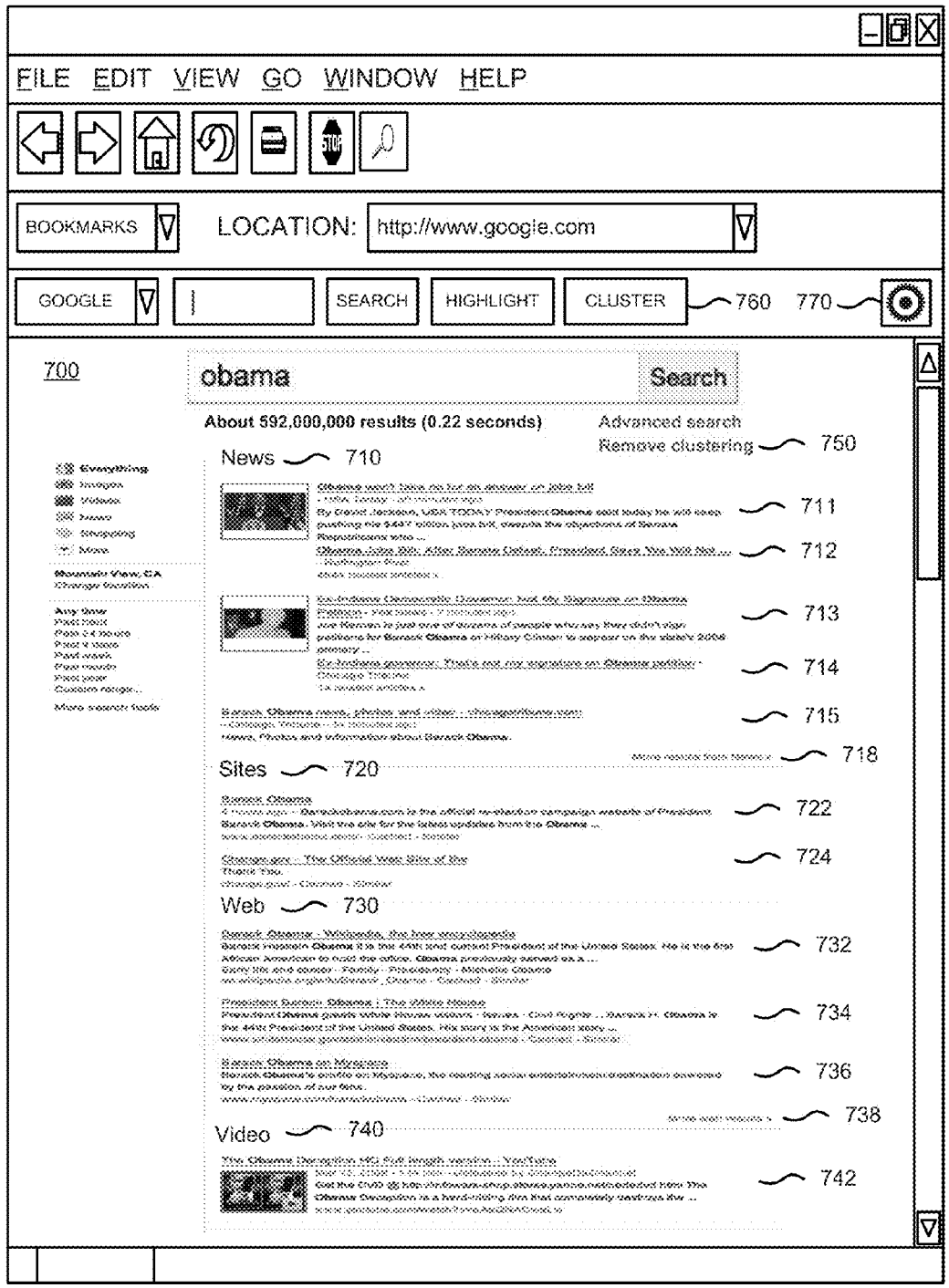
FIG. 7 is a diagram of an example search result document that presents search results organized by category.

FIG. 7 is a diagram of an example search result document 700 that presents search results organized by category. As shown in FIG. 7, search result document 700 may be generated based on a search performed using the search query "Obama." Search result document 700 may include a set of categories 710, 720, 730, and 740, which are identified, within search result document 700, by an appropriate label. Category 710 may be identified by a news category label, category 720 may be identified by a sites category label, category 730 may be identified by a web category label, and category 740 may be identified by a video category label.

Each category 710, 720, 730, or 740 may include one or more search results. For example, as shown in FIG. 7, news category 710 may include five search results 711-715 and a link to additional search results 718. Search result 711 may include information regarding a corresponding document, such as an image associated with the document, a title of the document (e.g., "Obama won't take no for an answer on jobs bill"), a source of the document (e.g., USA Today), a snippet that may include text that is selected from a body of the document, and/or a link to the document. Other search results 712-715 may include additional information or less information. For example, as shown in FIG. 7, search results 712 and 714 do not include a snippet. Link 718 may provide an option for additional search results for category 710. Selection of link 718 may cause an additional search to be performed for the search query "Obama" that is restricted to news category 710, and the presentation of results of the additional search. Thus, results, which are presented in response to a selection of link 718, may include only search results relating to news category 710.

As shown in FIG. 7, sites category 720 may include two search results 722 and 724 and no link to additional search results, as was included with news category 710. Search result 722 may include information regarding a corresponding document, such as a title of the document (e.g., "Barack Obama"), a source of the document (e.g., www.barackobama.com), a snippet from the document, and a link to the document. Search result 724 may include additional information or less information.

As shown in FIG. 7, web category 730 may include three search results 732, 734, and 736, and a link to additional search results 738. Search result 732 may include information regarding a corresponding document, such as a title of the document (e.g., "Barack Obama—Wikipedia, the free encyclopedia"), a source of the document (e.g., en.wikipedia.org/wiki/Barack_Obama), a snippet from the document, and a link to the document. Search results 734 and 736 may include additional information or less information. Link 738 may provide an option for additional search results for category 730. Selection of link 738 may cause an additional search to be performed for the search query "Obama" that is restricted to web category 730, and the presentation of results of the additional search. Thus, results, which are presented in response to a selection of link 738, may include only search results relating to web category 730.

As shown in FIG. 7, video category 740 may include one search result 742, and no link to additional search results, as was included with news category 710 and web category 730. Search result 742 may include information regarding a corresponding document, such as an image from the document, a title of the document (e.g., "The Obama Deception HQ Full length version—YouTube"), a source of the document (e.g., www.youtube.com/watch?v=eAaQNACwaLw), a snippet from the document, and a link to the document.

Search result document 700 may also include an option (shown as "Remove clustering") 750 that permits the presentation of search results, organized by category, to be turned off. For example, selection of option 750 may cause another search result document to be presented in which the search results are not organized by category. In one implementation, selection of option 750 may cause client 210 to send a request to search system 225 for the other search result document in which the search results are not organized by category. In another implementation, search system 225 may transmit both search result documents to client 210 in response to receiving the search query and prior to the selection of option 750. Client 210 may simply switch between the search result documents, in response to selection of option 750, rather than sending a request to search system 225.

Additionally, or alternatively, the browser, or an ad-on toolbar of the browser, may include another option (shown as "Cluster") 760 that permits the presentation of search results, organized by category, to be turned on or off. For example, selection of option 760 may cause another search result document to be presented in which the search results are not organized by category. In one implementation, selection of option 760 may cause client 210 to send a request to search system 225 for the other search result document in which the search results are not organized by category. In another implementation, search system 225 may transmit both search result documents to client 210 in response to receiving the search query and prior to the selection of option 760. Client 210 may simply switch between the search result documents, in response to selection of option 760, rather than sending a request to search system 225.

Additionally, or alternatively, the browser, an ad-on toolbar of the browser, or search result document 700 may include another option 770 that permits a user to turn on or off the presentation of search results organized by category. For example, selection of option 770 may cause a preferences page to be presented. Via the preferences page, the user may specify a preference for whether search results are to be organized by category. In one implementation, the preference, specified by the user, may be maintained for only a current search session. In another implementation, the preference, specified by the user, may be maintained across search sessions until the user changes the preference. The user may be permitted to change the preference at any time.

Figure 8:
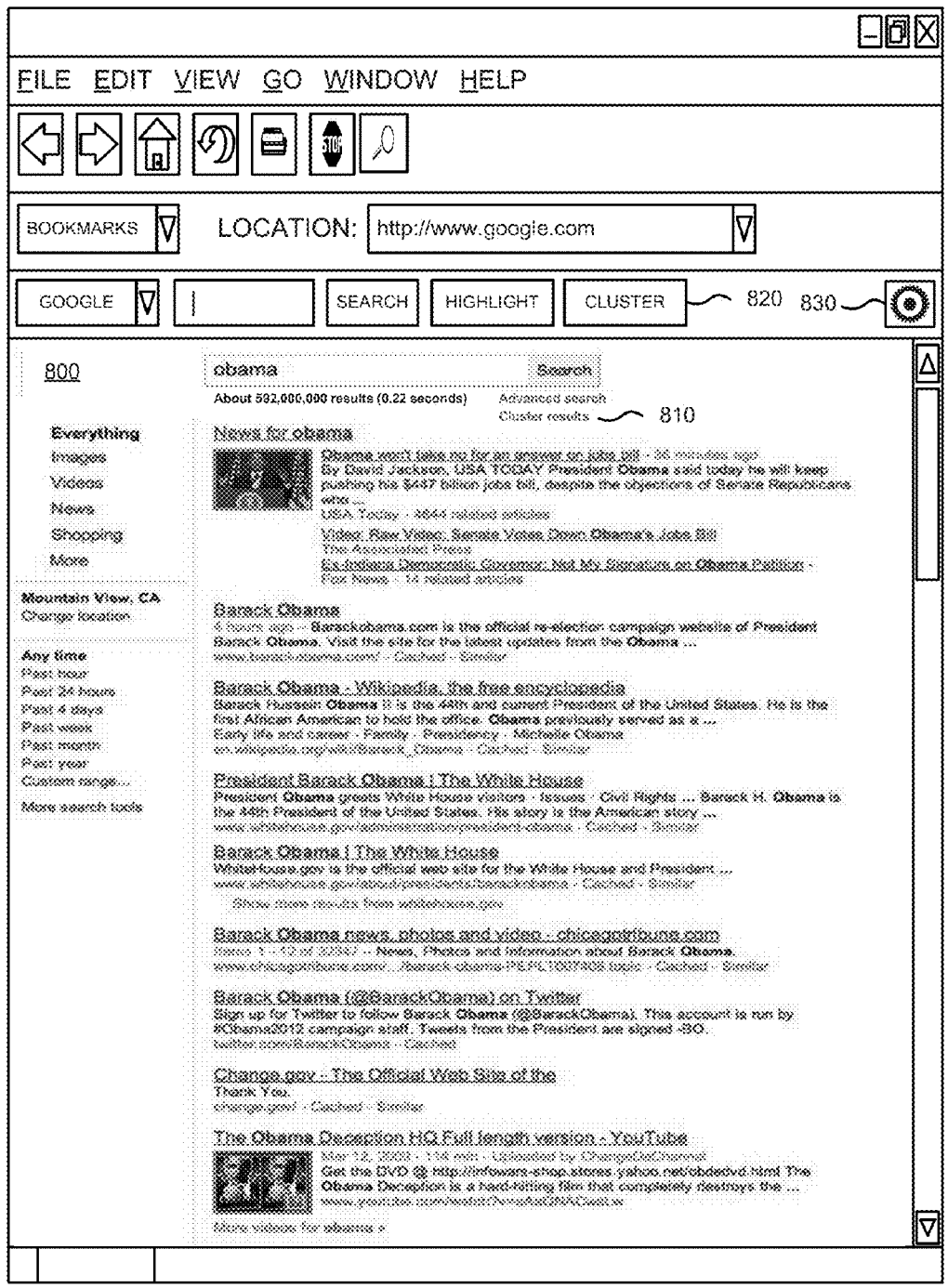
FIG. 8 is a diagram of an example search result document that presents search results that are not organized by category.

FIG. 8 is a diagram of an example search result document 800 that presents search results that are not organized by category. In one implementation, search result document 800 may be presented in response to selection of option 750 or 760 in FIG. 7.

As shown in FIG. 8, search result document 800 may be generated based on a search performed using the search query "Obama." Search result document 800 may include a list of search results that are organized by scores and are not intentionally organized by category. As a result, the list of search results, in search result document 800, is not as visually beneficial, to a user, as the search results presented in search result document 700. In other words, a user, receiving search result document 800, may need more time to locate a search result of interest than the user would if presented with search result document 700.

Similar to the search results in search result document 700, a search result, in search result document 800, may include information regarding a corresponding document, such as an image associated with the document, a title of the document, a source of the document, a snippet from the document, and/or a link to the document.

Search result document 800 may also include an option (shown as "Cluster results") 810 that permits the presentation of search results, organized by category, to be turned on. For example, selection of option 810 may cause another search result document to be presented in which the search results are organized by category. In one implementation, selection of option 810 may cause client 210 to send a request to search system 225 for the other search result document in which the search results are organized by category. In another implementation, search system 225 may transmit both search result documents to client 210 in response to receiving the search query and prior to the selection of option 810. Client 210 may simply switch between the search result documents, in response to selection of option 810, rather than sending a request to search system 225.

Additionally, or alternatively, the browser, or an ad-on toolbar of the browser, may include another option (shown as "Cluster") 820 that permits the presentation of search results, organized by category, to be turned on or off. For example, selection of option 820 may cause another search result document to be presented in which the search results are organized by category. In one implementation, selection of option 820 may cause client 210 to send a request to search system 225 for the other search result document in which the search results are organized by category. In another implementation, search system 225 may transmit both search result documents to client 210 in response to receiving the search query and prior to the selection of option 820. Client 210 may simply switch between the search result documents, in response to selection of option 820, rather than sending a request to search system 225.

Additionally, or alternatively, the browser, an ad-on toolbar of the browser, or search result document 800 may include another option 830 that permits a user to turn on or off the presentation of search results organized by category. For example, selection of option 830 may cause a preferences page to be presented. Via the preferences page, the user may specify a preference for whether search results are to be organized by category. In one implementation, the preference, specified by the user, may be maintained for only a current search session. In another implementation, the preference, specified by the user, may be maintained across search sessions until the user changes the preference. The user may be permitted to change the preference at any time.

The foregoing description provides illustration and description, but is not intended to be exhaustive or to limit the implementations to the precise form disclosed. Modifications and variations are possible in light of the above teachings or may be acquired from practice of the implementations.

For example, while a series of blocks has been described with regard to FIG. 6, the order of the blocks may be modified in other implementations. Further, non-dependent blocks may be performed in parallel.

Also, example user interfaces have been described with respect to FIGS. 1A, 1B, 7 and 8. In other implementations, the user interfaces may include additional, fewer, different, or differently arranged items of information.

As used herein, the term component is intended to be broadly interpreted to refer to hardware or a combination of hardware and software, such as software executed by a processor.

It will be apparent that systems and methods, as described above, may be implemented in many different forms of software, firmware, and hardware in the implementations illustrated in the figures. The actual software code or specialized control hardware used to implement these systems and methods is not limiting of the implementations. Thus, the operation and behavior of the systems and methods were described without reference to the specific software code—it being understood that software and control hardware can be designed to implement the systems and methods based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by one or more server devices, the method comprising:
  receiving, by at least one of the one or more server devices, a search query from a client device;
  identifying, by at least one of the one or more server devices, documents as search results relevant to the search query, where each of the search results has a respective first score;
  ranking, by at least one of the one or more server devices, the search results, based on the respective first scores, to form a ranked list of search results, where each of the search results has a respective position, within the ranked list, that is based on the ranking;
  determining, by at least one of the one or more server devices, a selection rate corresponding to each of the positions in the ranked list,
    a particular selection rate, corresponding to a particular position, being determined based on selections from the particular position, and
    determining the selection rate for one of the positions in the ranked list including:
      selectively:
        obtaining information regarding an actual selection rate, corresponding to the one of the positions, from observed selections, or
        estimating a selection rate corresponding to the one of the positions, and
      using the actual selection rate or the estimated selection rate as the selection rate for the one of the positions;
  identifying, by at least one of the one or more server devices, categories with which the search results are associated;
  generating, by at least one of the one or more server devices, second scores for the categories based on the selection rates, where the second score, for a particular one of the categories, is based on the selection rate corresponding to the position, in the ranked list, of one or more of the search results that are associated with the particular one of the categories, generating the second scores for the categories including:
    generating the second score, for one of the categories, based on a combination of a plurality of selection rates corresponding to positions, in the ranked list, of a set of the search results that are associated with the one of the categories;
  selecting, by at least one of the one or more server devices, a plurality of the categories based on the second scores of the categories;
  selecting, by at least one of the one or more server devices, a plurality of the search results for the selected plurality of categories;
  generating, by at least one of the one or more server devices, a search result document that includes information regarding the selected plurality of categories and information regarding the selected plurality of search results; and
  providing, by at least one of the one or more server devices, the search result document for display on the client device.

2. The method of claim 1, where the first score, for one of the search results, is based on at least one of:
  a measure of relevance of the one of the search results to the search query, or
  a measure of quality of the one of the search results.

3. The method of claim 1, where identifying the categories includes:
  performing a look-up in a memory device to identify the category with which one of the search results is associated, where the memory device stores information associating documents with categories.

4. The method of claim 1, where identifying the categories includes:
  classifying one of the documents to assign the search result, corresponding to the one of the documents, to one of the categories.

5. The method of claim 1, further comprising:
  comparing the respective first scores to a threshold value; and
  removing one of the search results, that has a respective first score that is less than the threshold value, before generating the second scores for the categories, where the second scores are generated without using information regarding the removed one of the search results.

6. The method of claim 1, where selecting the plurality of search results includes:
  selecting all of the search results associated with a set of the positions in the ranked list, where the set of the positions corresponds to a plurality of top positions in the ranked list.

7. The method of claim 1, where generating the search result document includes:
  organizing the selected plurality of categories within the search result document, where a first one of the selected plurality of categories is presented at a particular location within the search result document irrespective of the second score of the first one of the selected plurality of categories, and where a second one of the selected plurality of categories and a third one of the selected plurality of categories are presented, below the first one of the selected plurality of categories, based on the second scores of the second one of the selected plurality of categories and the third one of the selected plurality of categories.

8. A system, comprising:
  one or more server devices to:
    receive a search query from a client device;
    identify documents as search results relevant to the search query, where each of the search results has a respective first score;
    rank the search results, based on the respective first scores, to form a ranked list of search results, where each of the search results has a respective position, within the ranked list, that is based on the ranking;
    determine a selection rate corresponding to each of the positions in the ranked list,
      a particular selection rate, corresponding to a particular position, being determined based on selections from the particular position, and
      the one or more devices, when determining the selection rate for one of the positions in the ranked list, being further to:
        selectively:

obtain information regarding an actual selection rate, corresponding to the one of the positions, from observed selections, or estimate a selection rate corresponding to the one of the positions, and use the actual selection rate or the estimated selection rate as the selection rate for the one of the positions;

identify categories with which the search results are associated;

generate second scores for the categories based on the selection rates, where the second score, for a particular one of the categories, is based on the selection rate corresponding to the position, in the ranked list, of one or more of the search results that are associated with the particular one of the categories, the one or more server devices generating the second score, for one of the categories, based on a combination of a plurality of selection rates corresponding to positions, in the ranked list, of a set of the search results that are associated with the one of the categories;

select a plurality of the categories based on the second scores of the categories;

select a plurality of the search results for the selected plurality of categories;

generate a search result document that includes information regarding the selected plurality of categories and information regarding the selected plurality of search results; and provide the search result document for display on the client device.

9. The system of claim 8, where, when selecting the plurality of categories, at least one of the one or more server devices is to:

select a first one of the categories irrespective of the second score of the first one of the categories, and select a second one of the categories based on the second score of the second one of the categories, and where, when generating the search result document, at least one of the one or more server devices is to include information regarding the first one of the categories and the second one of the categories in the search result document.

10. The system of claim 8, where, when selecting the plurality of search results, at least one of the one or more server devices is to:

select a particular quantity of the search results, associated with one of the categories, when a quantity of the search results, associated with the one of the categories, is greater than the particular quantity, and select all of the search results, associated with the one of the categories, when the quantity of the search results, associated with the one of the categories, is less than or equal to the particular quantity.

11. The system of claim 8, where, when generating the search result document, at least one of the one or more server devices is to:

organize the selected plurality of search results based on the selected plurality of categories, where a first one of the selected plurality of search results is presented adjacent to a second one of the selected plurality of search results, where the first one of the selected plurality of search results and the second one of the selected plurality of search results are both associated with a same one of the selected plurality of categories.

12. The system of claim 11, where at least one of the one or more server devices is further to:

provide an option to remove the organization of the selected plurality of search results based on the selected plurality of categories;

receive selection of the option;

generate, in response to the selection of the option, another search result document that includes the ranked list of the search results, where the first one of the selected plurality of search results is not presented adjacent to the second one of the selected plurality of search results in the other search result document; and provide the other search result document for display on the client.

13. The system of claim 8, where at least one of the one or more server devices is further to:

compare the respective first scores to a threshold value; and remove one of the search results, that has a respective first score that is less than the threshold value, before generating the second scores for the categories, where the second scores are generated without using information regarding the removed one of the search results.

14. A non-transitory computer-readable medium, comprising:

a plurality of instructions which, when executed by one or more processors, cause the one or more processors to:

receive a search query from a client device;

identify documents as search results relevant to the search query, where each of the search results has a respective first score;

rank the search results, based on the respective first scores, to form a ranked list of search results, where each of the search results has a respective position, within the ranked list, that is based on the ranking;

determine a selection rate corresponding to each of the positions in the ranked list, a particular selection rate, corresponding to a particular position, being determined based on selections from the particular position, and the selection rate for one of the positions in the ranked list, being determined based on:

selectively:

obtaining information regarding an actual selection rate, corresponding to the one of the positions, from observed selections, or estimating a selection rate corresponding to the one of the positions, and using the actual selection rate or the estimated selection rate as the selection rate for the one of the positions;

identify categories with which the search results are associated;

generate second scores for the categories based on the selection rates, where the second score, for a particular one of the categories, is based on the selection rate corresponding to the position, in the ranked list, of one or more of the search results that are associated with the particular one of the categories, the second score, for one of the categories, being generated based on a combination of a plurality of selection rates corresponding to positions, in the ranked list, of a set of the search results that are associated with the one of the categories;

select a plurality of the categories based on the second scores of the categories;

select a plurality of the search results for the selected plurality of categories;

generate a search result document that includes information regarding the selected plurality of categories and information regarding the selected plurality of search results; and provide the search result document for display on the client device.

15. The non-transitory computer-readable medium of claim 14, where the plurality of instructions which, when executed by the one or more processors, further cause the one or more processors to:

compare the respective first scores to a threshold value; and remove one of the search results, that has a respective first score that is less than the threshold value, before generating the second scores for the categories, where the second scores are generated without using information regarding the removed one of the search results.

16. The non-transitory computer-readable medium of claim 14, where one or more instructions, of the plurality of instructions, to select the plurality of categories cause the one or more processors to:

select a first one of the categories irrespective of the second score of the first one of the categories, and select a second one of the categories based on the second score of the second one of the categories, and where one or more instructions, of the plurality of instructions, to generate the search result document cause the one or more processors to:

include information regarding the first one of the categories and the second one of the categories in the search result document.

17. The non-transitory computer-readable medium of claim 14, where one or more instructions, of the plurality of instructions, to select the plurality of search results cause the one or more processors to:

select a particular quantity of the search results, associated with one of the categories, when a quantity of the search results, associated with the one of the categories, is greater than the particular quantity, and select all of the search results, associated with the one of the categories, when the quantity of the search results, associated with the one of the categories, is less than or equal to the particular quantity.

18. The non-transitory computer-readable medium of claim 14, where one or more instructions, of the plurality of instructions, to select the plurality of search results cause the one or more processors to:

select all of the search results associated with a set of the positions in the ranked list, where the set of the positions corresponds to a plurality of top positions in the ranked list.

19. The non-transitory computer-readable medium of claim 14, where one or more instructions, of the plurality of instructions, to generate the search result document cause the one or more processors to:

organize the selected plurality of search results based on the selected plurality of categories, where a first one of the selected plurality of search results is presented adjacent to a second one of the selected plurality of search results, where the first one of the selected plurality of search results and the second one of the selected plurality of search results are both associated with a same one of the selected plurality of categories.

20. The non-transitory computer-readable medium of claim 19, where the plurality of instructions which, when executed by the one or more processors, further cause the one or more processors to:

provide an option to remove the organization of the selected plurality of search results based on the selected plurality of categories;

receive selection of the option;

generate, in response to the selection of the option, another search result document that includes the ranked list of the search results, where the first one of the selected plurality of search results is not presented adjacent to the second one of the selected plurality of search results within the other search result document; and provide the other search result document for display on the client.

21. The non-transitory computer-readable medium of claim 14, where one or more instructions, of the plurality of instructions, to generate the search result document cause the one or more processors to:

organize the selected plurality of categories within the search result document, where a first one of the selected plurality of categories is presented at a particular location within the search result document irrespective of the second score of the first one of the selected plurality of categories, and where a second one of the selected plurality of categories and a third one of the selected plurality of categories are presented, below the first one of the selected plurality of categories, based on the second scores of the second one of the selected plurality of categories and the third one of the selected plurality of categories.

* * * * *